(12) United States Patent
Meyers

(10) Patent No.: US 6,245,122 B1
(45) Date of Patent: Jun. 12, 2001

(54) APPARATUS AND METHOD FOR RECLAIMING SCRAP METAL

(75) Inventor: Frederick N. Meyers, Berkeley County, SC (US)

(73) Assignee: J. W. Aluminum Company, Charlestown, SC (US)

( * ) Notice: Subject to any disclaimer, the term of this patent is extended or adjusted under 35 U.S.C. 154(b) by 0 days.

(21) Appl. No.: 09/490,445

(22) Filed: Jan. 24, 2000

(51) Int. Cl.[7] ........................................ C22B 9/16
(52) U.S. Cl. .................... 75/385; 75/403; 75/687; 266/80; 266/82; 266/85; 266/100
(58) Field of Search ..................... 75/385, 403, 687; 266/80, 82, 85, 100

(56) References Cited

U.S. PATENT DOCUMENTS

| | | | |
|---|---|---|---|
| 3,933,343 | 1/1976 | Rawlings | 266/16 |
| 4,060,408 | 11/1977 | Kuhn | 75/68 |
| 4,113,977 | 9/1978 | Hochstrasser et al. | 13/2 |
| 4,319,921 | 3/1982 | Pryor et al. | 75/65 |
| 4,548,651 | 10/1985 | Ramsey | 134/11 |
| 4,601,750 | 7/1986 | Robak et al. | 75/65 |
| 4,931,013 * | 6/1990 | Brahmbhatt et al. | 266/44 |
| 5,035,402 | 7/1991 | Hengelmolen | 266/88 |
| 5,059,116 | 10/1991 | Gillespie et al. | 432/72 |
| 5,673,900 | 10/1997 | Riley | 266/44 |
| 5,846,480 | 12/1998 | Cibaldi | 266/158 |

* cited by examiner

Primary Examiner—Melvyn Andrews
(74) Attorney, Agent, or Firm—William S. Van Royen; David W. Pettis, Jr.; Pettis & Van Royen, P.A.

(57) ABSTRACT

An apparatus and method for reclaiming contaminated scrap metal, more particularly an improved reverberatory furnace designed for melting scrap. The amount of hydrocarbons volatilized from the melting of contaminated scrap is measured and the fumes are passed into the main hearth for burning. As the amount of fuel value contained within the fumes increases, the amount of fuel provided to the burner is proportionally reduced while the amount of oxygen is kept constant. This will ensure that the amount of fuel and the amount of oxygen present within the furnace is completely burned without excessive free oxygen or unburned fuel building up within the furnace or furnace exhaust. The burner will be operating under lean fuel conditions or under fuel rich conditions such that the flame temperature is lower than at stoichiometric firing, whereby the burners create reduced $NO_x$.

10 Claims, 6 Drawing Sheets

APPARATUS AND METHOD FOR RECLAIMING SCRAP METAL

BACKGROUND OF THE INVENTION

1. Field of the Invention

The present invention relates to an apparatus and method for reclaiming contaminated scrap metal, more particularly to an improved reverberatory furnace for melting scrap and collecting the combustible portion of the contaminates contained thereon. The furnace then quantifies the combustible contaminates and uses them as additional fuel for heating the furnace and the metal contained therein, which reduces fuel usage and eliminates the release of most pollution from the furnace.

2. Description of the Prior Art

Used metals are a major material resource used in making new products. In the aluminum industry, re-melting of aluminum scrap consumes only five percent of the energy required to make primary aluminum from bauxite. A common source of aluminum scrap includes turnings and borings from machine shops, the waste aluminum cut from the edges of aluminum sheets after rolling, the material remaining after punching or stamping, or scrapped aluminum products. This scrap material is collected and baled into various size bales, then shipped to recycling plants having furnaces particularly designed to process scrap metal. The metal is recycled by melting in a furnace and combining the melted scrap metal with molten metals of a predetermined purity to obtain the appropriate alloy. A major problem with scrap metal is that it contains various amounts of contaminants, particularly oils, grease, other lubricants, paints, lacquers etc., which are normally burnable hydrocarbons and will be volatilized during the melting process. Without appropriate cleaning of the exhaust fumes, at high-cost, these pollutants will be expelled into the atmosphere. A number of improvements to scrap metal furnaces have been made in an effort to eliminate the contaminants by separately burning the exhaust gases or by re-circulating the gases through the main burners.

For example U.S. Pat. No. 3,933,343 issued to Robert K. Rawlings discloses a well-type melting furnace that is divided into two communicating wells: a receiving well for the scrap material and a main holding well for holding the molten metal. A fume collection hood over the scrap receiving well collects the combustible fumes that issue from the scrap as it is melted and conducts the fumes through ductwork to a burner in the main holding well. The burner is operated at a high air level to ensure complete burning of the combustible fumes when they are received and a large amount of air is drawn into the scrap receiving well by the blower fan that transfers the fumes from the scrap receiving well to the burners in the main holding well. The blower fan maintains the scrap receiving well at a negative pressure, permitting air to enter from the outside. A sensor in the exhaust stack determines whether all exhaust fumes have been burned, and if they have not, additional air is added to improve combustion. The sensor in the exhaust stack provides a delayed indication of incomplete burning so that the adjustments are always accomplished after incomplete burning has commenced and contaminants have been exhausted through the stack. In addition, as long as burning is complete the sensors do not indicate any adjustment for reduction of the oxygen supply to the main hearth. If the temperature drops, fuel is furnished to the burners to raise the temperature. If the level of oxygen is considered too high, an adjustment is made by closing a valve, however, there isn't any indication of the basis for determining that the level is too high or the basis for the amount of adjustment that should be made.

U.S. Pat. No. 4,319,921 issued to Pryor, et al. discloses a scrap metal furnace that also transfers the vaporized combustibles to the main hearth through the main hearth burners. The duct work transferring the vapors includes a burner that is aimed downstream toward the main hearth. The burner pulls the gases from the scrap charging chamber, burns a portion of the combustible gases, and passes the remainder through one of the main hearth burners.

Notwithstanding the existence of such prior art furnaces, it remains clear that there is a need for a furnace that will adjust the amount of fuel provided to the burners based upon the amount of hydrocarbons that are being added to the main hearth. This will ensure complete burning is accomplished without fuel wastage or excess oxygen. $NO_x$ is a pollutant that is created when nitrogen and free oxygen are available in a high temperature environment, there is a need for a furnace that produces low levels of $NO_x$.

SUMMARY OF THE INVENTION

The present invention relates to an apparatus and method for reclaiming scrap metal that comprises a furnace that measures the hydrocarbons volatilized from the melting of contaminated scrap metal. Based upon the amount of hydrocarbons present, the amount of fuel provided to at least one burner will be increased or decreased. This will ensure that the amount of fuel and the amount of oxygen present within the furnace is completely burned without excessive free oxygen or unburned fuel (from all sources including the hydrocarbons obtained from the contaminated scrap).

Most simply stated, the scrap metal furnace of this invention comprises an enclosed first chamber and an enclosed second chamber. The first chamber comprises a lower portion, or charge well, for receiving molten metal and contaminated scrap material and an outlet above the molten metal contained within the charge well. The second chamber comprises a lower portion, or holding well, for containing molten metal, at least one burner for establishing a flame path over the well of the second chamber and an inlet above the molten metal contained within the well. A means is provided for movement of molten metal between the first and second chambers.

An enclosed passage extends from the outlet in the first chamber to the inlet of the second chamber for moving the volatilized hydrocarbon fumes from the first chamber to the second chamber. A means is also provided to move the fumes through the enclosed passage.

A sensor is installed within the enclosed passage to measure the quantity of combustible material contained within the fumes. This sensor is operatively connected to the controls of the burner so that the oxygen/fuel ratio may be adjusted, reducing the quantity of fuel provided to the burner. The oxygen/fuel ratio will be adjusted to a lean mixture to provide sufficient excess oxygen to mix with the combustible material added by the fumes passing through the inlet into the second chamber and completely burn that material. The burning of the combustible material will add sufficient heat to maintain the temperature within the second chamber, compensating for the reduced heat provided by the lean operating burner.

The invention accordingly comprises an article of manufacturer possessing the features, properties, and the relation to elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DESCRIPTION OF A PREFERRED EMBODIMENT

Figure 1:
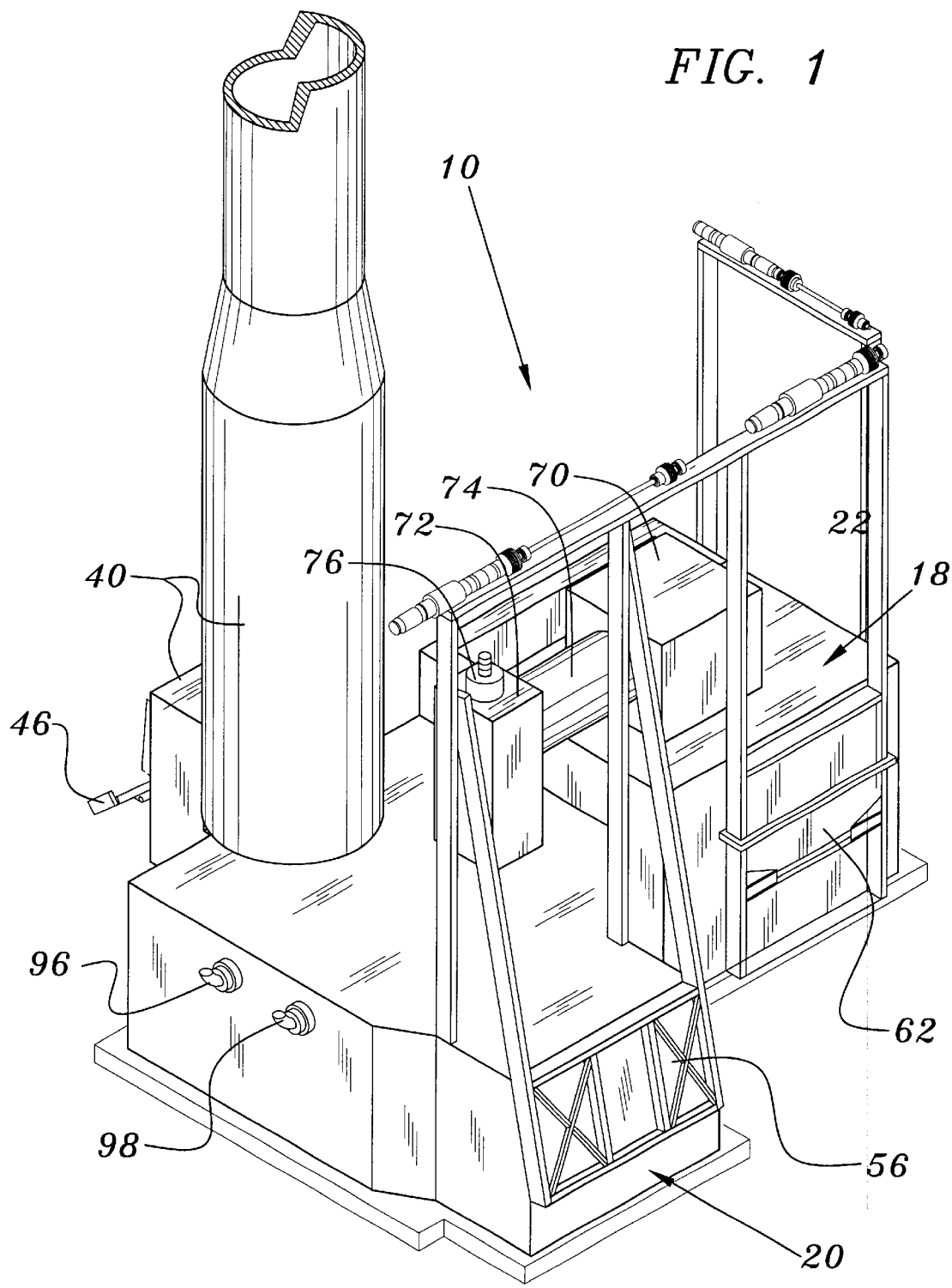
FIG. 1 is a perspective view of the scrap metal recovery furnace of this invention.
Figure 2:
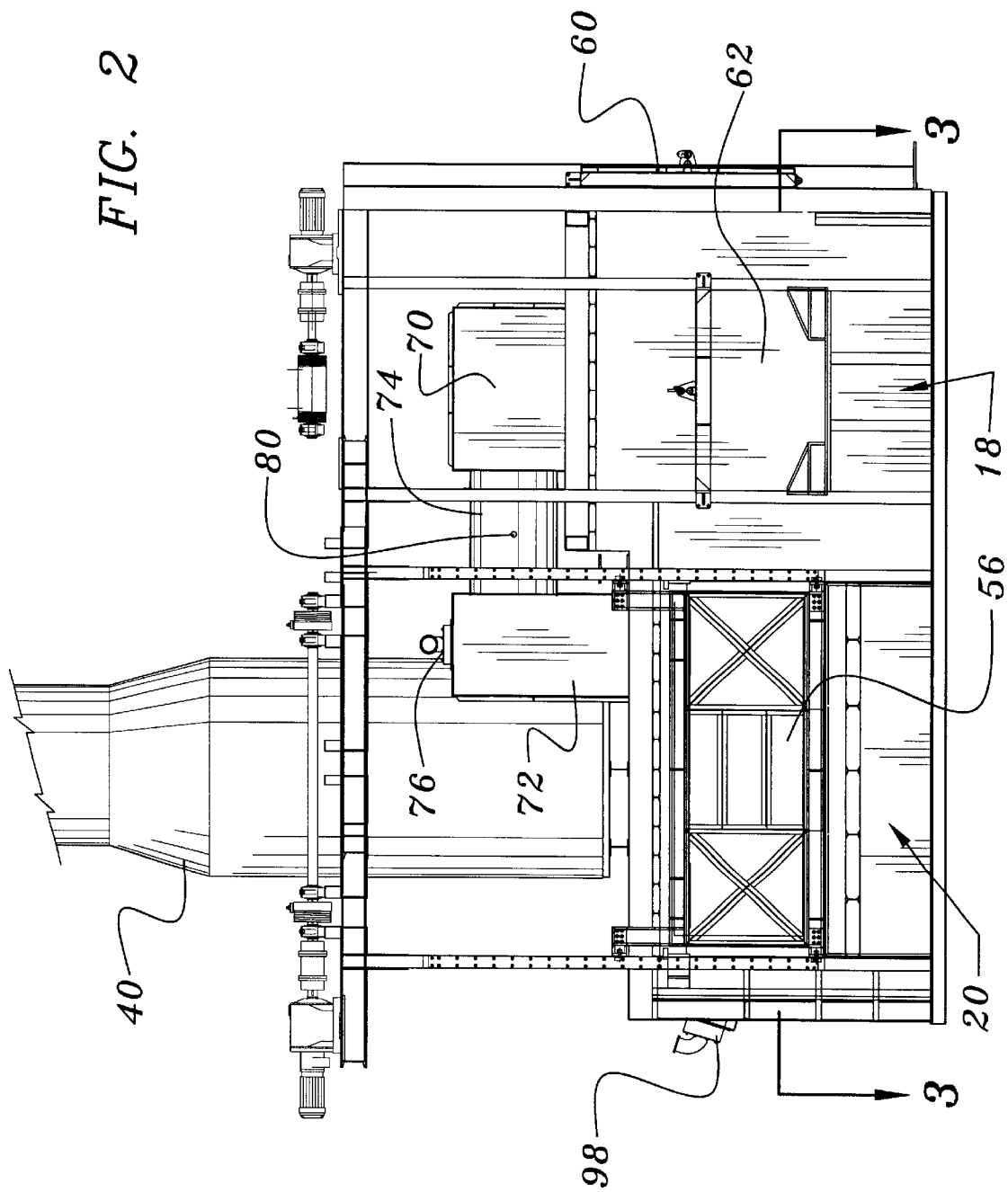
FIG. 2 is a front elevational view of the invention of FIG. 1.

A preferred embodiment for the apparatus of this invention, conveniently a reverberatory furnace designed for melting aluminum scrap, is illustrated in the drawing figures. The furnace is generally indicated as 10 in the views of FIGS. 1–5. The general construction of the supporting frame, the exterior and interior walls, the doors, etc. of the furnace 10, is generally standard for such reverberatory furnaces, and such construction is well known by those skilled in the art. For example, such furnaces are often constructed with an outer metallic casing 12 that is lined with modern refractory material 14, as shown in FIGS. 3–6. The refractory material 14 is used to retain the heat created within the reverberatory furnace 10 and to absorb the heat and reflect it back into the furnace chambers to melt the metal contained therein. Further, insulation material 16 is inserted between the metallic casing 12 and the refractory material 14 to reduce the heat loss by transfer from the refractory material 14 to the metal casing 12 and thence to the atmosphere. The furnace is comprised of three chambers, two of which are comprised of a floor, walls and ceiling that are constructed and joined together to be airtight and thoroughly covered by refractory material to reflect back the heat, prevent loss of heat, and prevent entrance of outside air. One of the chambers has no roof and is open to the atmosphere. Each of the doors are constructed by well-known means to be insulated and airtight so that the pressure within the two enclosed chambers of the furnace 10 may be maintained slightly above ambient pressure. The furnace is designed primarily for the recovery of scrap aluminum; however, the concepts disclosed and claimed are applicable to other contaminated scrap materials. Naturally, the recovery of materials with higher melt temperatures will require a furnace that is capable of higher temperatures. At higher temperatures parts in contact with the molten metal will have to be constructed from materials capable of withstanding these higher temperatures. For ease of discussion, the embodiments will be discussed in relation to the recovery of aluminum.

Figure 3:
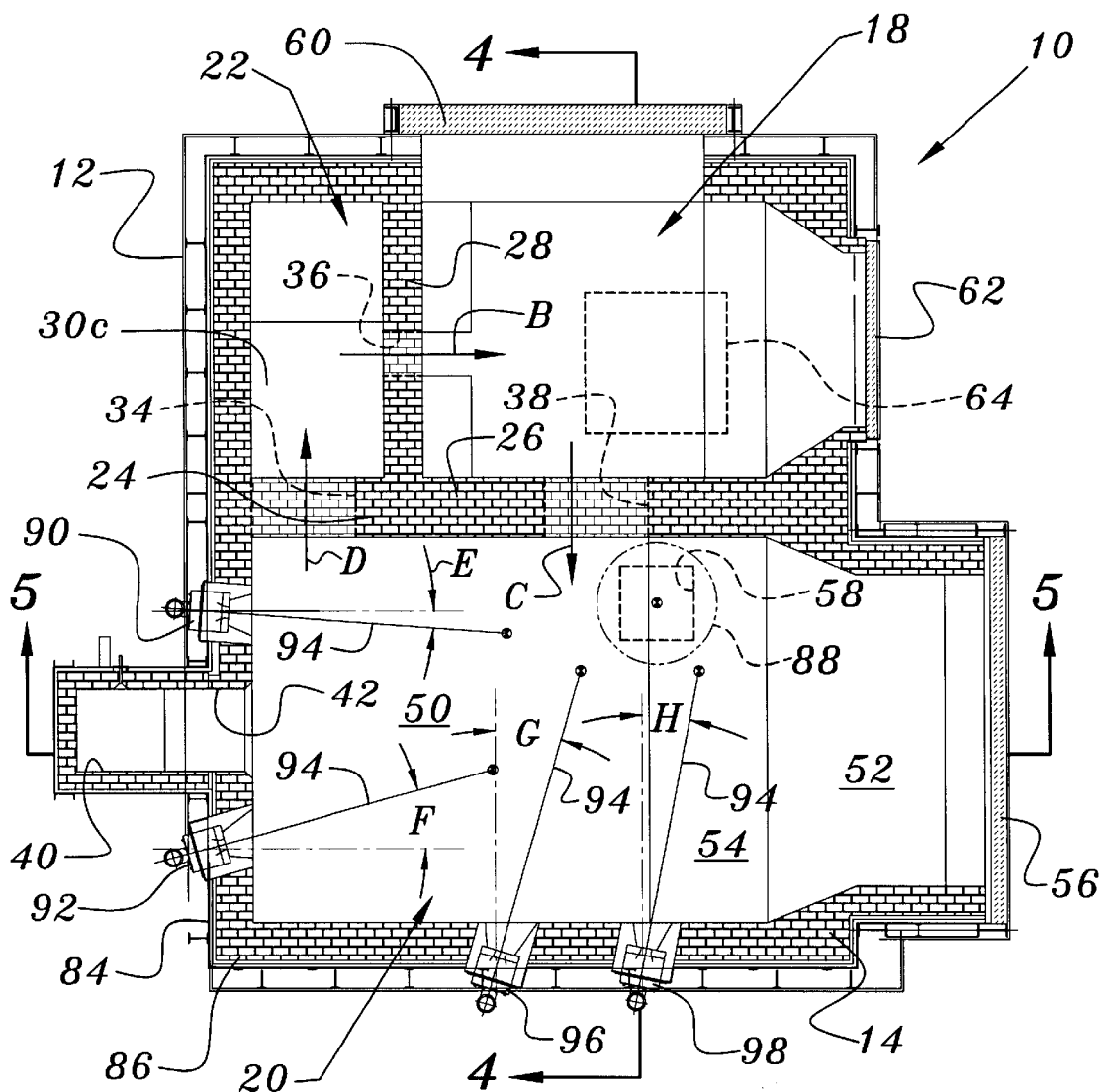
FIG. 3 is a cross-sectional plan view of the invention taken along line 3—3 of FIG. 2, showing a simplified structure for ease of view.

As seen in FIG. 3, the furnace 10 comprises: a first chamber, conveniently the scrap chamber 18; a second chamber, conveniently the main hearth 20; and a third chamber, conveniently pump well 22. These three chambers are separated from one another by dividing walls 24, 26 and 28 that are constructed from refractory material 14 that extends from the floor, 30a–b, to the ceiling of the furnace 32a–b, the pump well is without a ceiling and is open for ease of cleaning and maintenance of the circulating pump (not shown). There will be some heat loss from the pump well 22, but access to the pump is more critical. It is essential that each of the chambers be connected to one another for circulation of the molten metal. A first opening 34 extends through wall 34 to join the main hearth 20 with the pump well 22. A second opening 36 extends through wall 28 to join the pump well 22 with the scrap chamber 18. A third opening 38 extends through wall 26 to join the scrap chamber 18 with the main hearth 20. Each of the openings 34, 36 and 38 are adjacent to the floor 30a–c and do not normally extend upwardly above the bath level A, shown in FIGS. 4 and 5, which in this embodiment is no greater than 28 inches above the floor 30a–c. The pump well pump (not shown) includes an impeller designed to operate under high temperatures, which is mounted on a shaft that is connected to an electric motor. When the pump is operating and the furnace is loaded with molten metal, it circulates the molten metal from the pump well 22 through the opening 36 into the scrap chamber 18, from the scrap chamber 18 through opening 38 into the main hearth 20, and from the main hearth 20 through the opening 34 into the pump well 22, as shown by the arrows in FIGS. 3 and 6.

Figure 4:
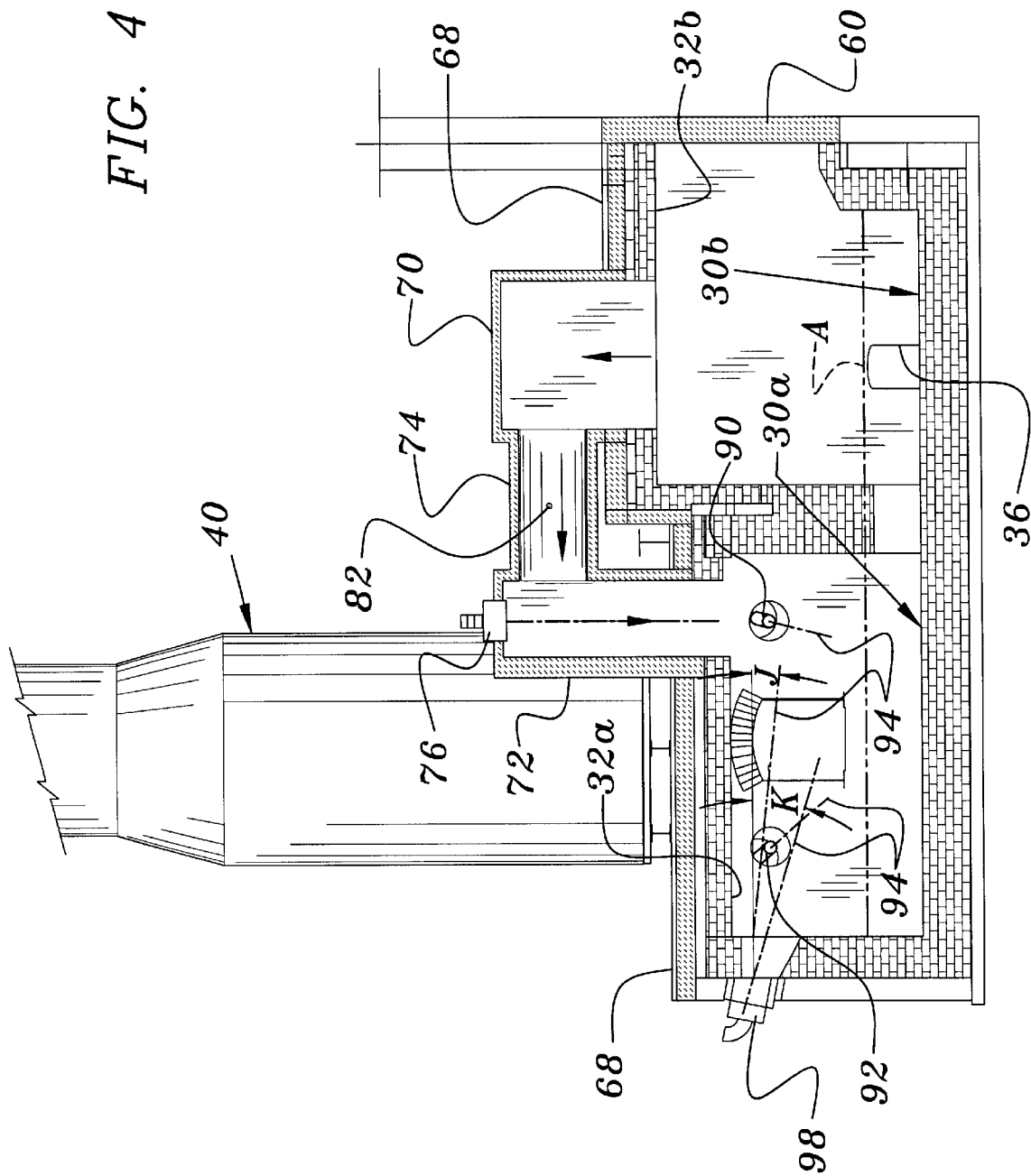
FIG. 4 is a cross-sectional elevational view of the invention taken along line 4—4 of FIG. 3.
Figure 5:
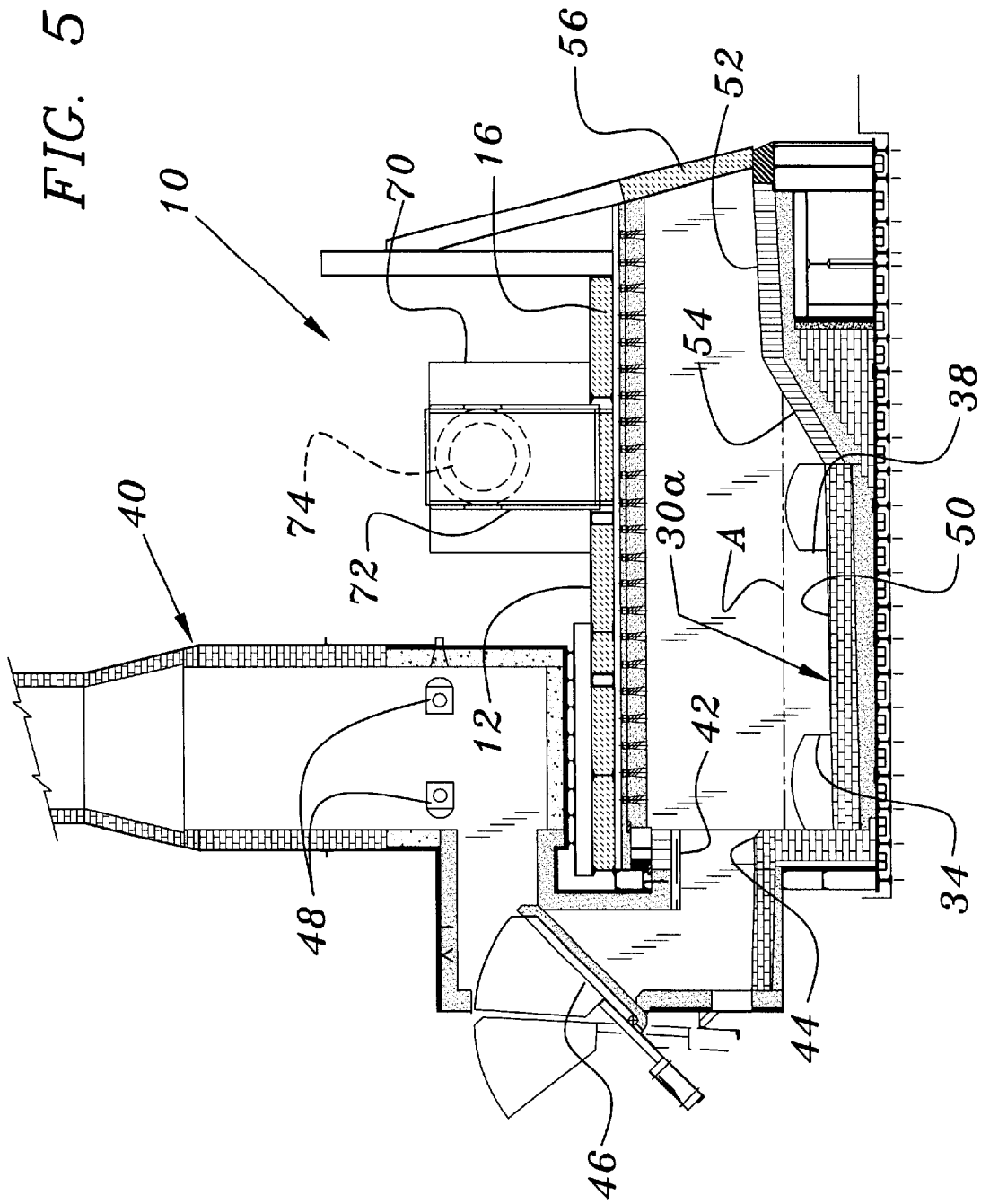
FIG. 5 is a cross-sectional elevational view of the invention taken along line 5—5 of FIG. 3.

In FIGS. 3 and 5, it can be seen that the furnace 10 further comprises an exhaust stack, shown generally as 40, which is connected to the main hearth 20 by aperture 42. The bottom 44 of aperture 42, as seen in FIG. 4, lies proximal to the bath level shown by line A rather than having the aperture 42 pass through the ceiling 32a of the main hearth 20. This placement provides improved retention time for the heat and the fumes within the main hearth 20. Within the stack 40 is a damper 46 which is used to control the release of exhaust gases from the furnace 10. A pressure control system within the furnace 10 (not shown), comprises sensors (not shown) that continually monitor the pressures within the main hearth 20 and the scrap chamber 18. The pressure control system operates the damper 42 to open or close the damper 42 to maintain a slightly positive pressure (0.05 inches of water) within the furnace 10. As long as the bath level A lies above the first opening 34, the second opening 36, and the third opening 38, the fact that the pump well 22 has no roof will have no effect on the maintenance of the slightly positive pressure in the main hearth 20 and the scrap chamber 18. The exhaust stack 40 may also include a burner mounted therein (not shown) as well as air inlets 48 to burn contaminants, if they should escape the main hearth 20.

The floor 30a of the main hearth 20 comprises three separate areas, the holding well 50, the sweat hearth 52 and the sweat hearth ledge 54. Sweat hearth ledge 54 and the holding well 50 hold the melted aluminum bath. The sweat hearth 52 is the area within the main hearth 20 on which solid aluminum piglets, sows, t-bars or other aluminum units of high-quality are placed for melting into the bath to maintain the bath level. The door 56 to the main hearth is raised briefly for the time necessary to load these units of aluminum. As seen in FIG. 5, the door 56 is angled off the vertical so that the weight of the door helps provide a tight seal to the frame around the opening and in addition it increases the sweat hearth area. An inlet 58 is formed through the ceiling 32a, proximal the dividing wall 26 and above the opening 38 and above the hearth ledge 54, as seen in FIG. 3.

The scrap chamber 18 has a lower portion, a scrap well 59 for receipt of the molten metal. The scrap chamber 18 also has two major points of access, charge door 60 and clean out door 62. These doors 60 and 62 are constructed by well-known means to maintain a tight seal when closed. It is through the charge door 60 that the contaminated scrap aluminum is added to the furnace 10. The bath may be mixed through the charge door 60 or through the clean out door 62 to assist in obtaining a complete melt and to separate contaminants from the bath. Those contaminants that are not volatilized are raked from the bath surface through the clean out door 62. An outlet 64 is formed through the ceiling 32b of the scrap chamber 18. An enclosed passage 66 is mounted on the roof 68 of the furnace 10 to join outlet 64 with inlet 58. The enclosed passage 66 is comprised of three parts: a fume box 70, that is sealingly mounted to the roof 68 and sized to cover the opening of the outlet 64; an inlet box 72 that is sealingly mounted to the roof 68 and sized to cover the opening of the inlet 58; and a cross duct 74 that joins the fume box 70 to the inlet box 72. The outlet 64 and the fume box 70 is relatively large to assist in the capture of fumes volatilized within the scrap chamber 18. A means for moving the fumes through the enclosed passage 66 is provided. As the fumes are generated within the scrap chamber 18, the pressure within the scrap chamber 18 increases. The fumes, being lighter than the ambient air, move upward and then move through the enclosed passage 66 to the main hearth 20 seeking a region of lower pressure. In a preferred embodiment, the natural movement of the fumes is assisted by an initial fume burner 76 that is connected to the enclosed passage 66 with its flame path directed toward the main hearth 20. The initial fume burner 76 pulls the fumes more rapidly through the enclosed passage 66. Also, by keeping the length of the cross duct 74 short, the speed of movement of the fumes is kept high to keep the particulate matter suspended within the fumes from precipitating out. In a preferred embodiment, the initial fume burner 76 is mounted to the inlet box 72 so that its flame path is aimed downwardly into the main hearth through the inlet 58.

A sensor 78 is mounted within the enclosed passage 66 proximal the fume box 70. The sensor 78 measures the fuel content of the fumes passing through the enclosed passage 66 that were volatilized from the contaminated scrap aluminum melted in the scrap chamber 18. Hydrocarbons comprise a dark material, and as the amount of hydrocarbons increase the fumes darken. In a preferred embodiment, the sensor is an opacity sensor, which comprises an emitter 80 and a receiver 82. The sensor 78 measures the reduction in the transfer of light from the emitter 80 to the receiver 82. The receiver captures the light received from the emitter and returns the light received by fiber optic cable to the emitter. The emitter makes a comparison between the light sent and that returned and the difference comprises the opacity, a measurement of the amount of hydrocarbons contained in the fumes. This measurement is sent by cable to the furnace control system (not shown) which comprises a computer. One suitable sensor, manufactured by Banner Engineering, Corp. of Minneapolis, Minn., is a high-power infrared sensor, model number OASBF 880 nm. BANNER® is a registered trademark of Banner Engineering Corp. Other models made by other manufacturers will be suitable, but each sensor must be calibrated for this particular purpose. There are other means for measuring the amount of hydrocarbons in vapors that are well know in the art, but they do not provide a sufficiently rapid and accurate measurement to make timely adjustments to the burner fuel/oxygen ratio.

The majority or all of the heat provided to the furnace 10 in the main hearth by at least one burner. In a preferred embodiment, as seen in FIG. 3, the best result is achieved by placement of four burners along two walls of the main hearth 20, the rear wall 84 and the left side wall 86. The number of burners required and their specifications are dependent upon the size of the aluminum bath, which is limited by the size of the hearth. For example, for a main hearth 20 that is 14 feet 6 inches wide and 24 feet 10 inches long (from the rear wall 80 to the door 56), which holds a full bath that has a length of 20 feet 6 inches and a depth of a 28 inches, four HAUCK® Model SVG 160 melter burners are provided in addition to the initial fume burner 76, which may also be the same model. These burners have the particular specifications that are suitable for this size main hearth 20. The specifications that are important are flame velocity, flame length and breadth, and flame envelope characteristics. The air/fuel ratios used will also affect the flame envelope characteristics and influences the angles at which the burner's flame path are angled over the bath. Burners manufactured by other companies may be used, but they must have the same specifications to be used with this particular hearth shape and capacity. From this information, those skilled in the art will be able to select appropriate burners for furnaces having different size hearths to provide different production rates.

The burner angles are very important to obtain the most efficient transfer of heat to the refractory and to the bath. As can be seen in FIG. 3, in a preferred embodiment in which the furnace is constructed to the measurements noted above, the burners are aimed at angles measured in relation to each burner's axis that is perpendicular to the walls on which the burner is mounted. The fumes containing the unburned hydrocarbons enter the main hearth 20 through the inlet 58 in an expanding cloud depicted as zone 88. To obtain complete burning of the fumes and the hydrocarbon particles contained within the fumes, heat, free oxygen, adequate residence time and thorough mixing of the hydrocarbons with the oxygen are necessary. As the burners add fuel, oxygen and exhaust gases (from the burning of the fuel) into the main hearth 20 the pressure within the hearth increases so that the exhaust gases and fumes seek to leave the hearth through the exhaust stack 40. To prevent a short circuit movement of unburned hydrocarbons directly to the stack 40, first burner 90 and second burner 92 are mounted in the rear wall 84 bracketing the aperture 42 that leads to the exhaust stack 40 so that their flame paths 94 are directed toward the zone 88. The third burner 96 is mounted to the left side wall 86 and is directed so that its flame path 94 comes between the zone 88 and the exhaust stack aperture 42. The flame path angles can be expressed in two components, a component of the angle in a horizontal plane and a component in a vertical plane. The horizontal components of the angles are shown in FIG. 3 and the visible vertical components are shown in FIG. 4. The horizontal angle E of the flame path of the first burner 90 is 4 degrees and its downward vertical angle (not shown) is 16 degrees. The horizontal angle F of the flame path of the second burner 92 is 15 degrees and the vertical angle (not shown) is 17 degrees. The horizontal angle G of the flame path of the third burner 96 is 16 degrees and its downward vertical angle J is 6 degrees. The horizontal angle H of the flame path of the fourth burner 98 is 11 degrees and its downward vertical angle K is 17 degrees. It is important that the flame paths of the burners mix with the fumes containing the hydrocarbons in order to obtain complete burning as rapidly as possible. These are but preferred angles and certainly angles that are plus or minus 3 degrees will still be efficient. The flame paths 94 of each burner can be seen more clearly in FIG. 6, which illustrates. their relationship to the zone of hydrocarbon fumes 88. As previously expressed, these particular angles are for the size and configuration of the furnace 10 discussed above, and furnaces having variations in size will require a thorough analysis to obtain the same relationship between the burner flame paths 94, the molten bath and the zone 88.

Figure 6:
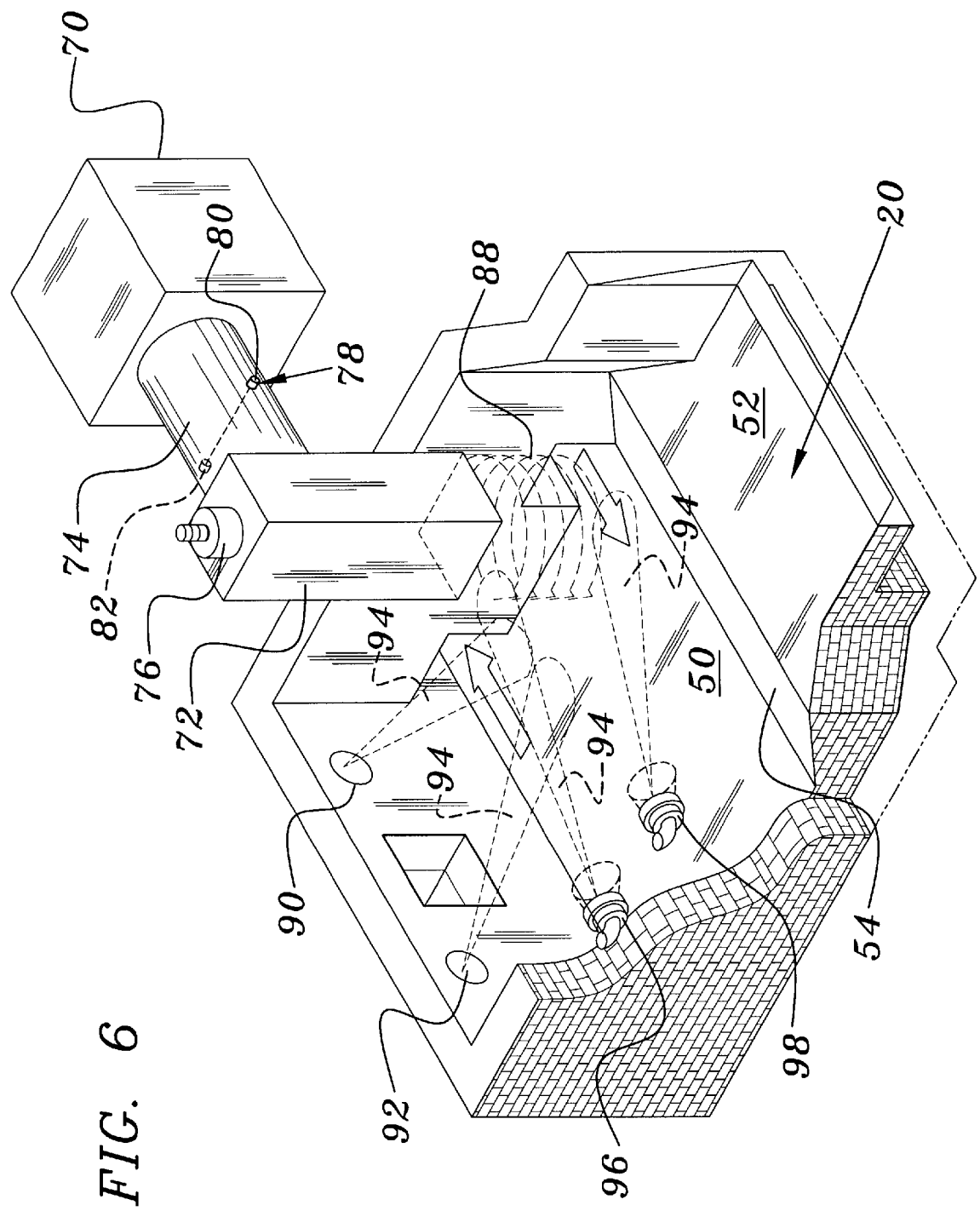
FIG. 6 is a detailed perspective view of the main hearth illustrating the burner flame paths and the movement of fumes therein.

As can be seen in FIGS. 3 and 6, the flame paths 94 strike the edges of the zone 88 to create a turbulent or chaotic (undefined) vortex that comprises a generally counterclockwise whirling motion imparted by the tangential impact of the various burner angles. The third burner imparts a clockwise gathering motion just as the fuel rich vapors exit the roof inlet 58. The other three burner angles are intended to inundate the existing fuel rich zone 88 with just enough free oxygen to burn the fuel present and provide a counterclockwise motion to the vapors and fumes, organizing them for burning. The flame paths of the burners 90, 92, 96 and 98 are oxygen rich when they are operated with a fuel/oxygen ratio that is lean. It is important that sufficient oxygen to be available for the complete burning of all fuel, including the hydrocarbons from the scrap metal, therefore the fuel/oxygen ratio must become increasingly lean as the amount of hydrocarbons in zone 88 are increased. This is the purpose for the measurement of the amount of hydrocarbons being added to the main hearth 20. The first and second burners 90 and 92 are directed toward the bath surface, but at a point which will not break or ripple the aluminum oxide boundary layer that exists on the surface of the molten bath. Rippling the bath surface creates additional aluminum oxide, which interferes with heat transfer and wastes aluminum, as aluminum oxide is a byproduct having less value.

The optimum fuel/oxygen ratio for furnace burners is stoichiometric firing, where the number of free oxygen molecules matches the number of carbon and hydrogen molecules provided by the fuel, in this preferred embodiment natural gas. Stoichiometric firing provides complete burning, that is, there will not be any appreciable amounts of free oxygen molecules or unburned natural gas remaining. However, at stoichiometric firing the burners are being operated at peak flame temperatures which creates $NO_x$. $NO_x$ production is a function of flame temperature, the higher the flame temperatures at which the burners operate the greater the amount of $NO_x$ that is created. $NO_x$ steals the oxygen needed for burning and is a pollutant; therefore, $NO_x$ production must be reduced to as low a level as possible.

With the burners set to create the amount of heat needed to maintain the ideal temperatures within the furnace 10 and adjusted for stoichiometric firing, when additional fuel is added by the fumes from the melting scrap metal, the fuel/oxygen ratio will be out of adjustment and fuel will remain unburned. In this embodiment, the amount of oxygen will be held generally constant and the amount of fuel will be adjusted by reducing the amount of natural gas being federal to the burners, so that the fuel/oxygen ratio becomes lean. By obtaining a measurement of the fuel content in the fumes collected from the scrap chamber 18, the natural gas may be proportionally reduced and the fumes are burned as a substitute fuel for the natural gas. Operation of burners at less than optimal fuel/oxygen ratios, that is lean or rich, reduces the flame temperatures, reducing $NO_x$ production. The objective of a scrap metal recovery furnace is to burn as much contaminated scrap as possible, which provides as much substitute fuel as possible, and enables the operation of the burners in the main hearth at lower flame temperatures at a high percentage of time, significantly reducing $NO_x$ production. The initial fume burner 76 will be inundated with fumes and will operate in a fuel rich atmosphere and thus will also operate at cooler flame temperatures producing less $NO_x$.

The signal from the sensor 78 is calibrated between zero and 100 percent. At zero all light is transmitted from the emitter 80 to the receiver 82 and there are minimal, if any, hydrocarbons passing by the sensor 78. At 100 percent the signal is totally blocked and maximum hydrocarbons are passing by the sensor 78. In a preferred embodiment, adjustment of the fuel/oxygen ratio of each of the four burners provides very efficient performance. The furnace control system comprises a computer connected to the sensor 78 and connected to the burner controls (not shown). The computer compares the measurement of hydrocarbons provided by the sensor 78 against a predetermined standard (discussed below), and then signals the burner controls to adjust the fuel/oxygen ratio accordingly. If the signal sent to the furnace control system (not shown) is 10 percent or less the computer makes no change to the fuel/oxygen ratio, between 10 and 35 percent, the computer switches the burners to a predetermined low excess air fuel/oxygen ratio setting, between 36 and 75 percent, the computer switches the burners to a predetermined medium excess air fuel/oxygen ratio setting, and above 75 percent the computer switches the burners to a predetermined high excess air fuel/oxygen ratio. The actual fuel/oxygen ratios must be established and entered into the computer by those skilled in the art for each furnace 10, as these ratios will vary based upon all the variables: including but not limited to, the burners, size of furnace, size of bath, scrap and metal contaminants. It is possible to overcharge any scrap metal furnace with contaminated scrap, creating an overload or slug of hydrocarbons that cannot be handled by the burners. By carefully calculating the amount of contaminants contained within the scrap material such over charging can be avoided. To prevent polluting the atmosphere a burner (not shown) placed within the stack 40 may be ignited by the furnace controls to burn those hydrocarbons that were not burned within the furnace when the sensor approaches 100 percent opacity.

The fuel rich fumes received from the scrap chamber 18 enter the main hearth 20 proximal the opening 38 and proximal the sweat hearth 52, zone 88. The burners 90, 92, 96 and 98 as well as the initial fume burner 76 are all directed to create an area of highest heat in the zone 88. The area below zone 88 is also where the coldest portion of the circulating bath is received into the main hearth 20, through opening 38, and the sweat hearth 52 is where cold metal is added to the bath in the main hearth 20. The vortex created in zone 88 over this area provides complete burning of the contaminants reducing fuel costs by allowing the burners 90, 92, 96 and 98 to operate at a lean fuel/oxygen ratio.

The improvements discussed above all work in a synergistic relationship in that the proper application of high velocity burners, burner ratio compensation, delayed mixing, in furnace recirculation, furnace pressure control and volatilized hydrocarbon quantification all combine in this design to produce a very efficient and much improved reverberatory furnace with significantly reduced particulate and $NO_x$ emissions.

Having thus set forth a preferred construction for the apparatus of the current invention, is to be remembered that this is but a preferred embodiment. Attention is now invited to a description of the operation of the furnace 10.

The furnace 10 must be brought up to operating temperature and must contain a less than a full bath of molten aluminum, before it can operate as a scrap metal recovery furnace. The pump (not shown) in the pump well 22 is in operation to provide circulation of the molten aluminum through the three chambers, the scrap chamber 18, the main hearth 20 and the pump well 22. The pump draws the molten aluminum from the main hearth 20 passes it through the pump well 22 into the scrap chamber 18 and back into the main hearth 22, as shown by the arrows B, C and D in FIG. 3. The molten aluminum is heated to a temperature that is sufficiently high to volatilize any volatile contaminants contained in the scrap metal to be added to the molten bath in the scrap chamber 18.

A bale or bales of contaminated scrap aluminum are measured and weighed to determine the approximate quantity of contaminants and to determine which bale or combination of bales the furnace has the capacity to accept. The door 60 is opened and the bales are inserted within the scrap chamber 18. There are no burners in this chamber and the scrap aluminum is melted by the molten aluminum that is circulated through the furnace 10, as previously described.

The heat of the molten aluminum volatilizes the hydrocarbon contaminants into fumes that carry particulate matter. Care is taken not to load the scrap so rapidly that a slug of fumes is created. The vaporization of the hydrocarbons increases the pressure within the scrap chamber 18 so that the fumes rise upwardly toward the fume box 70. The initial fume burner 76 draws the fumes into the fume box 70 and through the cross duct 74, and then pushes the fumes through the inlet box 72 and out the inlet 58. As the fumes paths through the flame path of the initial fume burner 76, a portion of these fumes are burned, however the fumes are so fuel rich that the initial fume burner 76 is unable to burn them all. The initial fume burner 76 is operating with a fuel/oxygen ratio that is fuel rich; therefore, the flame temperature is cooler than the flame temperature would be at stoichiometric firing, reducing the production of $NO_x$.

The fumes enter the main hearth 20 in a swirl of gases and particulate matter, schematically depicted as zone 88. The four burners in the main hearth were initially operating at stoichiometric firing. The sensor 78 measures the amount of light lost during transmission of a light beam between the emitter 80 and the receiver 82. This measurement is forwarded by cable to the furnace 10 control computer (not shown). Depending upon the percent of opacity of the fumes, the computer controls will adjust the fuel/oxygen ratio of the burners, reducing the amount of fuel provided to compensate for the fuel added by the unburned hydrocarbons. Reduction of the fuel will make the burner exhaust gases oxygen rich for complete burning of the hydrocarbons in the fumes. The flame paths of each burner are directed toward the zone 88 to bar movement of the fumes directly to the exhaust stack 40, to provide spin to the fumes creating a turbulent vortex of fuel and to provide oxygen rich burner exhaust gases for burning the hydrocarbons provided by the fumes. The measurement of the fuel being added by the fumes permits a close match of oxygen to fuel availability so that complete burning is accomplished without excess oxygen. As the burners are operating with reduced fuel their flame temperatures are reduced and $NO_x$ production is well below that produced under stoichiometric firing. The heat loss caused by the burners burning lean is made up by the heat generated by the burning of the fumes outside the flame envelope. As previously discussed, the greater the amount hydrocarbons provided the less $NO_x$ production. The exhaust gases eventually work their way to the stack 40. The damper 46 is controlled to maintain the slightly positive pressure within the furnace 10.

As aluminum is drawn off, scrap metal is added to provide continuous operation of the furnace 10. At times to provide the alloy content that is desired, additional aluminum with the calculated percentage of aluminum plus other metals necessary to obtain the final alloy desired, will be added through door 56 and placed on the sweat hearth 52 for melting. Also, pure aluminum may be required to maintain a full bath, particularly if very dirty scrap metal is added, as care must be taken not to over burden the furnace 10.

Having thus set forth a preferred construction and a description of the operation of the furnace, attention is now invited to a description of the method for reclaiming metals from contaminated scrap.

The method for reclaiming scrap metal comprises a series of steps. First metal is melted into a molten state by at least one burner. The molten metal is flowed into a first enclosed chamber, conveniently scrap metal chamber 18, from a second enclosed chamber, conveniently main hearth 20. A portion of the molten metal is held in the charge well 59, the lower portion of the first chamber.

Scrap metal contaminated with combustible matter is then federal into the molten metal held in the charge well 59 that is heated to a temperature sufficient to vaporize the combustible materials on the scrap metal. The combustible fumes are moved from the scrap metal chamber 18 to the main hearth 20 through an enclosed passage. The quantity of combustible material carried by the fumes is measured by a sensor as the fumes pass by the sensor mounted within the enclosed passage. The amount of fuel federal to the burner is adjusted in accordance with amount of combustible material determined to be in the fumes, so that the burner is operated at a lean fuel/oxygen ratio so that the burner produces a cooler flame temperature creating reduced $NO_x$ in comparison with stoichiometric firing.

A preferred embodiment, comprises the added step of pulling the fumes through the enclosed passage by an eductor means which may comprise a jet pump mounted within the enclosed passage 66 or an initial fume burner 76 mounted within the enclosed passage 66 downstream from the sensor.

An additional added step comprises swirling the fumes within the second chamber proximal the point at which the fumes enter the second chamber, the inlet, by directing the flame paths of the plurality of burners tangentially at the fumes to impart a turbulent or chaotic (undefined) vortex that comprises a generally counterclockwise whirling motion imparted by the tangential impact of the various burner angles, thereby mixing free oxygen with the fuel rich fumes for complete burning.

While the foregoing describes a particularly preferred embodiment of the present invention, providing an efficient scrap metal recovery furnace, it is to be understood that numerous variations and modifications of the structure will occur to those skilled in the art. Accordingly, the foregoing description is to be considered illustrative only of the principles of this invention and is not to be considered to be limitative thereof, the scope of the invention being determined solely by the claims appended hereto.

What is claimed is:

1. A scrap metal recovery furnace for reclaiming metals from metallic scrap material contaminated with combustibles comprising:

an enclosed first chamber, the lower portion of which is a charge well for receiving molten metal and for receiving scrap material, said first chamber having an outlet above the level of said molten metal;

an enclosed second chamber, the lower portion of which comprises a holding well to contain molten metal, said second chamber having;

at least one burner for establishing a flame path over said well of said second chamber, said burner having adjustable oxygen/fuel controls operatively connected thereto;

an inlet above the level of said molten metal; and an exhaust opening above the level of said molten metal;

means connecting said first chamber to said second chamber so that said molten metal in said second chamber may flow into said first chamber;

an enclosed passage extending from said outlet in said first chamber to said inlet of said second chamber such that fumes volatilized from melted scrap in said first chamber are movable to said second chamber;

means for moving said fumes through said enclosed passage;

a furnace control system being operatively connected to said burner oxygen and fuel controls; and a sensor for measuring the quantity of combustible matter in said fumes being inserted in said enclosed passage such that said fumes pass by said sensor, said sensor being connected to said furnace control system such that said oxygen/fuel ratio setting of said burner is adjusted by said furnace control system according to a predetermined ratio based on the measurement of combustible matter contained in said fumes.

2. A furnace as in claim 1 wherein when said sensor indicates the presence of combustible matter in said fumes, said furnace control system signals said burner controls to decrease the amount of fuel federal to said burner.

3. A furnace as in claim 1 further comprising an initial fume burner mounted in said enclosed passage such that the flame path of said initial fume burner is directed into said second chamber, whereby said fumes are pulled from said first chamber, pass through said flame path, and enter said second chamber.

4. The furnace as in claim 3 comprises a plurality of burners mounted to the walls of said second chamber, each burner having a flame path, said flame path of each said burner of said plurality of burners being directed toward a zone of fumes below the inlet within said second chamber such that said flame paths cause the fumes and exhaust gases from said burners to circulate in a chaotic vortex, whereby said fumes are burned.

5. The furnace as in claim 1 further comprising doors opening into said first and second chambers, said doors being sealable to prevent infiltration of air therethrough, said furnace further comprising an exhaust stack having a damper being operatively adjustable between a closed position and an open position, a pressure sensor mounted in said furnace controlling said damper to maintain a predetermined pressure within said furnace above ambient pressure.

6. A method for reclaiming metal from scrap metal contaminated with combustible matter, which comprises the steps of:

(a) providing a bath of molten metal in an enclosed first chamber and in an enclosed second chamber;

(b) feeding scrap material contaminated with combustible matter into said enclosed first chamber;

(c) operating at least one burner in said second chamber to heat said enclosed second chamber to a temperature sufficient to;

(i) maintain said bath of molten metal in said second chamber, said first and second chambers being connected so that said molten metal in said second chamber flows between said first and second chambers melting said scrap received in said first chamber, and (ii) vaporize combustible matter received with said scrap metal producing fumes in said first chamber;

(d) moving said fumes from said first chamber to said second chamber;

(e) measuring quantity of combustible matter in said fumes; and (f) adjusting the fuel to oxygen ratio provided to said burner in accordance with the amount of combustible matter determined to be in said fumes such that said fuel fed to said burner is reduced or increased in reverse proportion to the amount of combustible matter provided by said fumes.

7. The method of claim 6 which comprises the further steps of;

(a) moving said fumes through an enclosed passage, said first chamber having at least one outlet above said molten metal and said second chamber having at least one inlet above said molten metal, such that said enclosed passage extends from said first chamber outlet to said second chamber inlet;

(b) passing said fumes past a sensor located in said enclosed passage; and (c) measuring the combustible matter in said fumes with said sensor.

8. The method of claim 7 which comprises the further step of ejecting said fumes from said first chamber by an eductor means.

9. The method of claim 7 which comprises the further step of passing said fumes through a flame path that extends toward said inlet, said flame path being generated by an initial fume burner connected to said enclosed passage.

10. The method of claim 6 which comprises the further steps of directing the flame path of four burners mounted in said second chamber toward a zone of fumes below the inlet within said second chamber such that said flame paths cause the fumes and exhaust gases from said burners to circulate in a chaotic vortex, whereby said fumes are burned.

* * * * *

UNITED STATES PATENT AND TRADEMARK OFFICE
CERTIFICATE OF CORRECTION

PATENT NO.    : 6,245,122 B1                                        Page 1 of 1
DATED         : June 12, 2001
INVENTOR(S)   : Frederick N. Meyers It is certified that error appears in the above-identified patent and that said Letters Patent is hereby corrected as shown below:

In the filing date, delete "24" and insert -- 20 --.

<u>Column 11, claim 2,</u>
Line 29, delete "federal" and insert therefor -- fed --.

Signed and Sealed this

Fifteenth Day of January, 2002

Attest:

JAMES E. ROGAN
*Attesting Officer*    *Director of the United States Patent and Trademark Office*